No. 675,093. Patented May 28, 1901.
A. T. HARPER.
PLOW ATTACHMENT.
(Application filed Mar. 13, 1901.)
(No Model.)
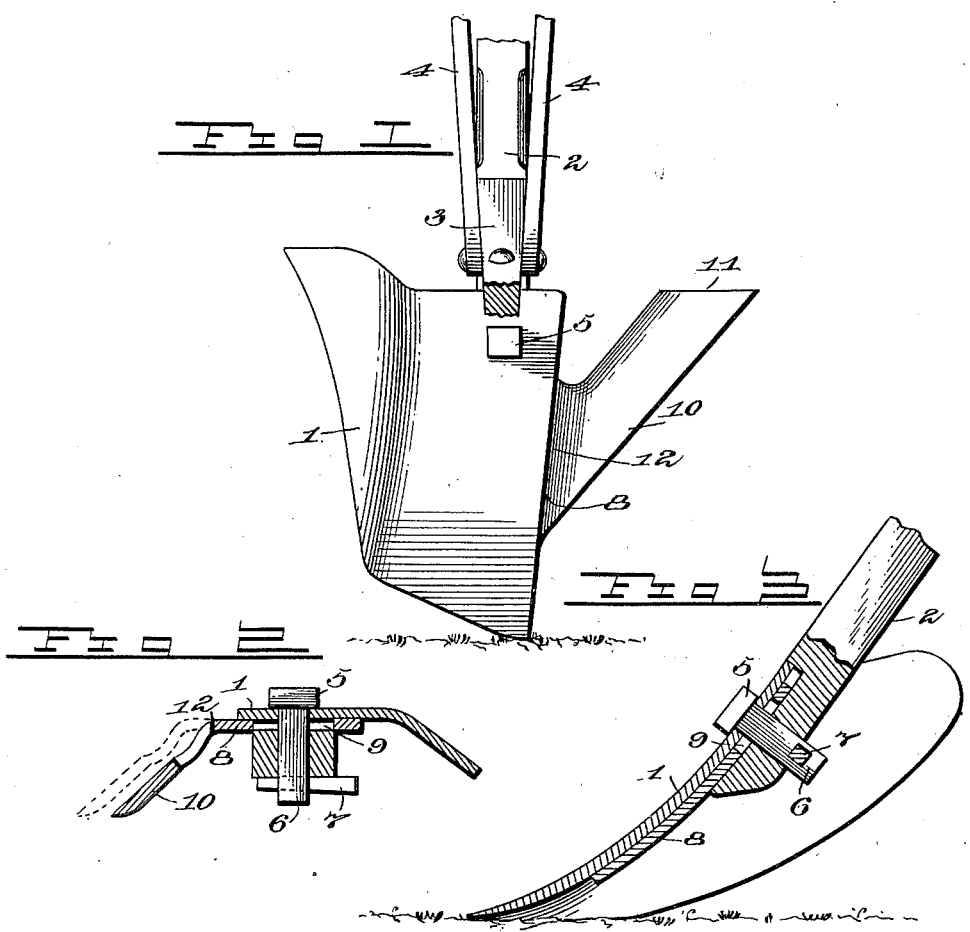
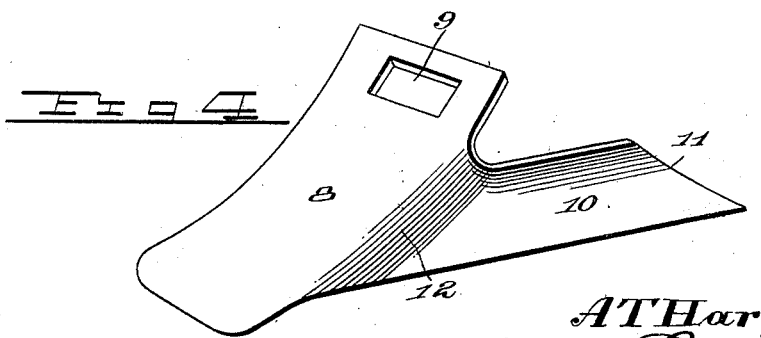
Witnesses
John Maypin,
R. M. Smith.
Inventor
A T Harper
By E G Siggers
Attorney
THE NORRIS PETERS CO., PHOTO-LITHO., WASHINGTON, D. C.

UNITED STATES PATENT OFFICE.

AARON T. HARPER, OF OPP, ALABAMA.

PLOW ATTACHMENT.

SPECIFICATION forming part of Letters Patent No. 675,093, dated May 28, 1901.

Application filed March 13, 1901. Serial No. 50,974. (No model.)

*To all whom it may concern:*

Be it known that I, AARON T. HARPER, a citizen of the United States, residing at Opp, in the county of Covington and State of Alabama, have invented a new and useful Plow Attachment, of which the following is a specification.

This invention relates to attachments for plows; and the object in view is to provide an attachment in the form of a blade having a projecting wing which is adapted to be applied to any ordinary plow and interposed and held between the plow or share and the stock or standard to which the plow is connected. Provision is also made for rendering the attachment adjustable laterally with respect to the standard and also for permitting a slight adjustment of the attachment up or down on the standard, so as to set the same in the desired relation to the point of the plow and obtain any desired amount of projection of the laterally-extending wing. In addition to the adjustments referred to the attachment may also be partially turned between the plow and stock, so as to give any desired inclination or elevation to the wing of the device. The projecting wing is designed for the purpose of destroying grass and weeds in the drill and also to apply the soil smoothly to the young plants, the space or opening between the body of the blade and the wing serving to allow a portion of the soil to pass over it and fall into the furrow behind, thereby preventing an excess of soil being applied to the young and tender plants.

With the above and other objects in view, which will more fully appear as the description proceeds, the invention consists in the novel construction, combination, and arrangement hereinafter fully described, illustrated, and claimed.

In the accompanying drawings, Figure 1 is a front elevation of a plow, showing the attachment applied thereto. Fig. 2 is a cross-section taken in line with the fastening device. Fig. 3 is a vertical longitudinal section taken in line with the fastening device, and Fig. 4 is a detail perspective view of the attachment *per se.*

Like numerals of reference designate corresponding parts in all the figures of the drawings.

In the drawings I have represented an ordinary plow point or share 1, which is connected to and mounted upon the stock or standard 2, carried by the usual beam 3, the said parts being suitably braced and connected to the handle-braces 4, all of said parts being of any usual or preferred construction and the plow point or share 1 being connected to the standard by means of a fastener 5, which, for convenience, is shown in the form of a bolt having a square shank 6, provided with an opening for the reception of a wedge 7, which is adapted to engage the under or rear side of the standard 2 for securely holding the plow-point in position on the standard.

The attachment contemplated in this invention consists of a blade 8, which forms the body of the attachment and which has a curvature corresponding to the curvature of the plow point or share, as shown in Figs. 3 and 4. The blade 8 is provided at or near its upper end with a transversely-elongated rectangular slot 9, adapted to receive the fastener 6, by which the plow-point is secured to the standard. The blade or body 8 is provided at one side with a laterally-projecting and obliquely-extending wing 10, which terminates in an oblique outer edge 11 and which adjacent to its point of juncture with the body 8 is slightly curved or offset in a rearward direction, as shown at 12. As shown in Figs. 1 and 4, a V-shaped space is thus left between the body 8 and blade 10 at the upper or rear portion of the attachment, so as to allow a portion of the soil to pass over the wing and through said opening and into the furrow, thereby preventing an excess of soil from being applied to the young and tender plants.

In applying the attachment the body portion or blade 8 is inserted between the body of the plow 1 and the adjoining face of the standard, and the fastening device 6 is passed through the plow and also through the slot 9 in the attachment and on through the standard, where after properly adjusting the attachment the fastener is held by means of the retaining-wedge 7, as shown in Figs. 2 and 3.

By providing the transversely-elongated slot 9 the attachment is capable of being adjusted laterally to a considerable extent with respect to the standard and plow, and in this way any desired amount of projection may be given to the wing 10. The slot 9 is also made somewhat wider than the shank 6, as shown in Fig. 3, so as to permit a certain amount of vertical adjustment of the attachment with respect to the standard and plow. Owing to the nature of the connection between the attachment and the standard the attachment may also be swung, as on a pivotal connection with the standard, so as to set the wing 10 at different angles, according to the nature of the work to be performed.

It will thus be seen that the attachment is securely held between the plow and the standard and that in the movement of the plow the wing serves to counteract the tendency for side thrust and cause the plow to follow a straight line with greater ease. It will also be seen that the wing will cut and destroy grass and weeds contained in the drill and at the same time apply soil smoothly to the young plants, any excess of soil passing through the V-shaped space between the body of the attachment and the wing.

The attachment will be found of special utility in barring and cultivating cotton, corn, peanuts, and plants of a like nature.

Having thus described the invention, what I claim is—

1. The combination with a plow-stock, and a plow-point secured thereto by means of a fastener passing through the plow point and stock, of an attachment comprising a body portion interposed and held between the plow point and stock and provided with a transversely-elongated opening to receive said fastener, and also provided with an obliquely-extending wing projecting laterally from one side of the body, the attachment as a whole being adjustable transversely and longitudinally with respect to the stock, substantially as and for the purpose specified.

2. An attachment for plows and the like, comprising a longitudinally-curved body portion provided with a transversely-elongated slot, and a laterally-projecting wing extending obliquely thereto and having its rear edge arranged substantially in the same transverse plane with the rear edge of the body portion, the rearwardly-diverging portions of the body and wing forming an intervening space or notch, substantially as and for the purpose set forth.

In testimony that I claim the foregoing as my own I have hereto affixed my signature in the presence of two witnesses.

AARON T. HARPER.

Witnesses:
JNO. E. STANLEY,
J. T. BRADSHAW.